United States Patent
Uchida et al.

(10) Patent No.: US 7,804,757 B2
(45) Date of Patent: Sep. 28, 2010

(54) HOLOGRAM RECORDING AND REPRODUCING APPARATUS

(75) Inventors: Akiyoshi Uchida, Kawasaki (JP); Kazushi Uno, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 642 days.

(21) Appl. No.: 11/712,052

(22) Filed: Feb. 28, 2007

(65) Prior Publication Data

US 2007/0206478 A1    Sep. 6, 2007

(30) Foreign Application Priority Data

Mar. 6, 2006    (JP)    ............................. 2006-059117

(51) Int. Cl.
    *G11B 7/00*    (2006.01)
(52) U.S. Cl. ..................................... 369/103
(58) Field of Classification Search ................ 369/103; 359/10, 11, 22
    See application file for complete search history.

(56) References Cited

U.S. PATENT DOCUMENTS

| | | | | |
|---|---|---|---|---|
| 6,888,785 B2 * | 5/2005 | Morrison | ..................... | 369/103 |
| 6,961,161 B2 * | 11/2005 | Tsukagoshi et al. | ........... | 359/10 |
| 7,324,255 B2 * | 1/2008 | Tanaka et al. | .................. | 359/11 |
| 7,518,974 B2 * | 4/2009 | Yamakage et al. | .......... | 369/103 |
| 7,564,761 B2 * | 7/2009 | Taguchi | ...................... | 369/103 |
| 2003/0043150 A1 | 3/2003 | Hwang | | |
| 2005/0018263 A1 * | 1/2005 | Pharris | ........................ | 359/22 |
| 2005/0270855 A1 * | 12/2005 | Earhart et al. | .......... | 365/189.05 |

FOREIGN PATENT DOCUMENTS

JP    2003-76256    3/2003

* cited by examiner

Primary Examiner—Thang V Tran
(74) Attorney, Agent, or Firm—Fujitsu Patent Center

(57) ABSTRACT

A hologram recorder/player includes recording beam modulation controller which causes a spatial light modulator to modulate the recording beam in such a way that a hologram is recorded in a plurality of blocks in a unit recording region and that each of the blocks includes recording information (DATA) and error correction code, at a time of recording. The hologram recorder/player includes incident angle variable controller which varies a reference beam incident angle to a plurality of predetermined angles with respect to the unit recording region. The recording beam modulation controller causes the modulation of the recording beam in such a way that a different hologram is generated for a page each time the reference beam incident angle is varied and that the hologram in each page is recorded in a plurality of the blocks.

7 Claims, 5 Drawing Sheets

HOLOGRAM RECORDING AND REPRODUCING APPARATUS

BACKGROUND OF THE INVENTION

1. Field of the Invention

The present invention relates to a hologram recorder/player for recording holograms in a hologram recording medium and replaying holograms recorded in the hologram recording medium.

2. Description of the Related Art

A conventional hologram recorder/player is disclosed in JP-A-2003-76256 for example. This hologram recorder/player uses so called angle multiplex method for recording a hologram (page data) per page in a hologram recording medium. When the hologram is recorded, the hologram is stored in parts in a page which serves as a unit recording region divided into a central region and peripheral regions, and by re-arranging only the peripheral regions, the two-dimensional rectangular hologram is converted into a circular or an n-sided polygonal shape for recording. This arrangement minimizes image distortion caused by optical system components such as lenses when the hologram is reproduced, and therefore reduces information loss at the time of replay.

However, while the above-described conventional hologram recorder/player deals with hologram image distortion caused by optical components, it does not deal at all with hologram image distortion caused by other factors such as thermal shrinkage of the medium at the time of laser beam application and change in the wavelength. Shrinkage of the medium or change in the wavelength can disable detection of replay beams for some parts of the hologram recorded in the unit recording region even if laser beam application conditions for the replay (such as the incident angle of the reference beam) are exactly the same as those for recording. There is a risk, therefore, that the hologram is not replayed accurately in its entirety. Other problems with the above-described conventional hologram recorder/player include signal loss at borderline areas when re-arranging is made at the time of replay, and detection of unintended signals which are recorded at different angles other than the intended angle.

SUMMARY OF THE INVENTION

The present invention has been proposed under the above-described circumstances, and it is therefore an object of the present invention to provide a hologram recorder/player capable of replaying holograms accurately in their entirety.

In order to solve the problems, the present invention makes use of the following technical means.

The present invention provides a hologram recorder/player for recording a hologram in a unit recording region of a recording medium by application of a recording beam modulated by a spatial light modulator and a reference beam of a same wavelength as of the recording beam to the unit recording region for mutual interference between the recording beam and the reference beam under a predetermined beam application condition, and for replaying the hologram recorded in the unit recording region by application of the reference beam to the unit recording region where the hologram is recorded and subsequent detection by a photo detector of a replay beam reflected accordingly. The hologram recorder/player includes recording beam modulation control means which causes the spatial light modulator to modulate the recording beam in such a way that the hologram is recorded in a plurality of blocks in the unit recording region and that each of the blocks includes recording information and an error correction code or an error detection code for the recording information, at a time of recording.

Preferably, the recording beam modulation control means causes the modulation of the recording beam in such a way that each of the blocks contains a position detection mark.

Preferably, the hologram recorder/player further includes incident angle variable control means which varies a reference beam incident angle to a plurality of predetermined angles with respect to the unit recording region. The recording beam modulation control means causes the modulation of the recording beam in such a way that a different hologram is generated for a page each time the reference beam incident angle is varied and that the hologram in each page is recorded in a plurality of the blocks.

Preferably, the incident angle variable control means controls the reference beam incident angle more finely than the predetermined angles for detection of a replay beam by the photo detector for each of the blocks at a time of replay.

Preferably, the hologram recorder/player further includes decoding means which decodes the recording information and the error correction code or the error detection code for each of the blocks based on the replay beam detected specifically for the block by the photo detector, and code check means which checks the recording information decoded for each of the blocks, for an error based on the error correction code or the error detection code.

Preferably, there is provided a hologram recording/replaying method for recording a hologram in a unit recording region of a recording medium by application of a recording beam modulated by a spatial light modulator and a reference beam of a same wavelength as of the recording beam to the unit recording region for mutual interference between the recording beam and the reference beam under a predetermined beam application condition, and for replaying the hologram recorded in the unit recording region by application of the reference beam to the unit recording region where the hologram is recorded and subsequent detection by a photo detector of a replay beam reflected accordingly: The method causes the spatial light modulator to modulate the recording beam in such a way that the hologram is recorded in a plurality of blocks in the unit recording region and that each of the blocks includes recording information and an error correction code or an error detection code for the recording information, at a time of recording.

Preferably, the recording information and the error correction code or the error detection code are decoded for each of the blocks from the replay beam detected by the photo detector for the block, and the decoded recording information for each of the blocks is checked for an error based on the error correction code or the error detection code, at a time of replay.

According to the arrangement as the above, it is possible to detect a hologram in partial blocks from a unit recording region and to check the recording information contained in each block based on the error correction code or the error detection code. Hence, it is possible to replay holograms accurately in their entirety by choosing an optimum beam application condition for each block.

Other characteristics and advantages of the present invention will become clearer from the following detailed description to be made with reference to the attached drawings.

DETAILED DESCRIPTION OF THE PREFERRED EMBODIMENT

Hereinafter, preferred embodiments of the present invention will be described with reference to the drawings. FIGS. 1 through 5 show an embodiment of the hologram recorder/player according to the present invention.

Figure 1:
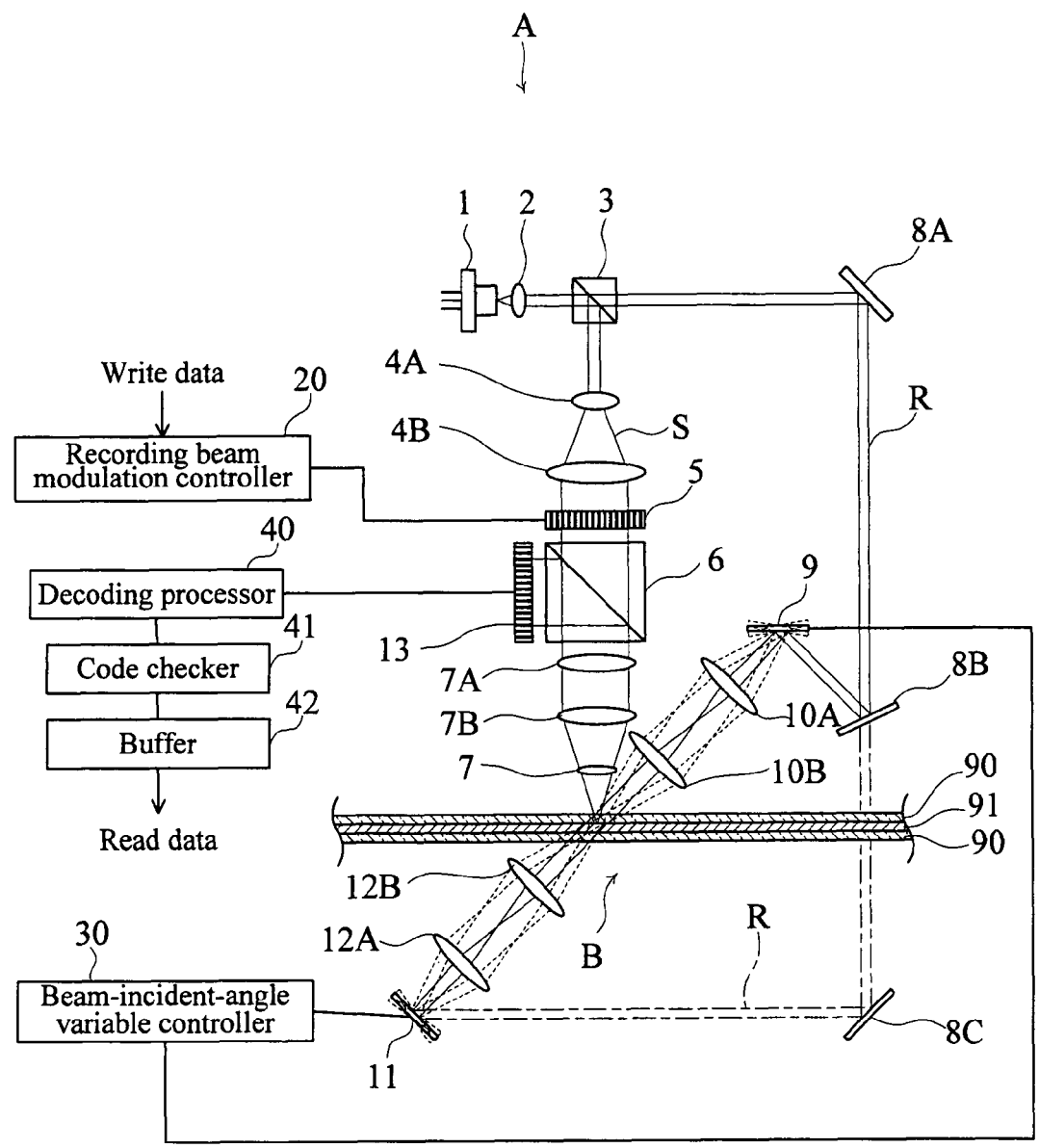
FIG. 1 is an overall configuration diagram of a hologram recorder/player as an embodiment of the present invention.

As shown in FIG. 1, the hologram recorder/player A according to the present embodiment includes elements constituting the optical system such as a light source 1, a collimating lens 2, a first beam splitter 3, beam expanders 4A, 4B, a spatial light modulator 5, a second beam splitter 6, relay lenses 7A, 7B, an object lens 7, fixed mirrors 8A, 8B, 8C, a recording galvanometer mirror 9, recording condenser lenses 10A, 10B, a replaying galvanometer mirror 11, replaying condenser lenses 12A, 12B, and a photo detector 13. The spatial light modulator 5 is controlled by a recording beam modulation controller 20. The recording and the replaying galvanometer mirrors 9, 11 are controlled by a beam-incident-angle variable controller 30. The photo detector 13 is connected with a decoding processor 40, a code checker 41 and a buffer 42. Other elements which are not illustrated include, for example, a rotation mechanism for rotating a disc-shaped hologram recording medium B, a tracking servo mechanism for moving the optical system radially of the hologram recording medium B, and a microcomputer which provides overall control. The recording beam modulation controller 20, the beam-incident-angle variable controller 30, and the decoding processor 40 are connected with the microcomputer.

The hologram recording medium B which is used in the hologram recorder/player A has a recording layer 91 sandwiched between two optically transparent protective layers 90A, 90B. Beams can be applied to the recording layer 91 from both sides. As a recording beam S and a reference beam R interfere with each other while crossing at a predetermined angle in a unit recording region, holograms each having a specific interference stripe pattern in accordance with the crossing angle are recorded in the recording layer 91. When replaying, only the reference beam R is applied as indicated by phantom lines, to the hologram recording medium B from the opposite side as from during the recording. In response to the reference beam R, a replay beam comes out of the unit recording region, and travels to the object lens 7.

The light source 1, which is provided by e.g. a semiconductor laser device, outputs a laser beam which is a coherent light at a time of recording as well as replaying. The collimating lens 2 converts the laser beam from the light source 1 into a parallel beam. The parallel beam from the collimating lens 2 travels to the first beam splitter 3. The first beam splitter 3 splits the incoming parallel beam into a recording beam S which travels to the spatial light modulator 5, and a reference beam R which travels through a different optical path to the recording and the replaying galvanometer mirrors 9, 11. Thus, the wavelength of the reference beam R at the time recording is always identical with the wavelength of the recording beam S. The beam expanders 4A, 4B, provided by combined lenses, expand the diameter of the recording beam S while introducing the recording beam S to the spatial light modulator 5.

The spatial light modulator 5, provided by e.g. a liquid crystal display device, works at the time of recording, and modulates the incoming beam into a recording beam S which represents a two-dimensional pixel pattern. The recording beam modulation controller 20 controls the spatial light modulator 5 so that write data supplied from outside as an object of recording is converted to a recording beam S which has the following pixel pattern: As exemplified in FIG. 2, the recording beam S is a result of optical conversion of the write data, and has a two-dimensional pixel pattern. Further, the entire pixel pattern is divided into a plurality of blocks Bk1 through Bk3. Each of these blocks Bk1 through Bk3 is assigned with recording information (DATA 1 through DATA 3), each of which is a portion of the write data, and error correction codes (ECC) for the recording information, in the form of pixel pattern. Further, each of the blocks Bk1 through Bk3 includes block position detection marks PM which have a predetermined regular pixel pattern and are disposed diagonally at two corner portions of the block.

Returning again to FIG. 1, the recording beam S from the spatial light modulator 5 passes through the second beam splitter 6, the relay lenses 7A, 7B and the object lens 7, and then illuminates the unit recording region of the hologram recording medium B. In the present embodiment, the recording beam S is applied substantially perpendicularly (at zero incident angle) to the unit recording region, and the incident angle of the recording beam S is fixed. At a time of replay, the recording beam S is blocked by all of the pixels in the spatial light modulator 5, so that the recording beam S is not applied to the unit recording region of the hologram recording medium B.

Figure 2:
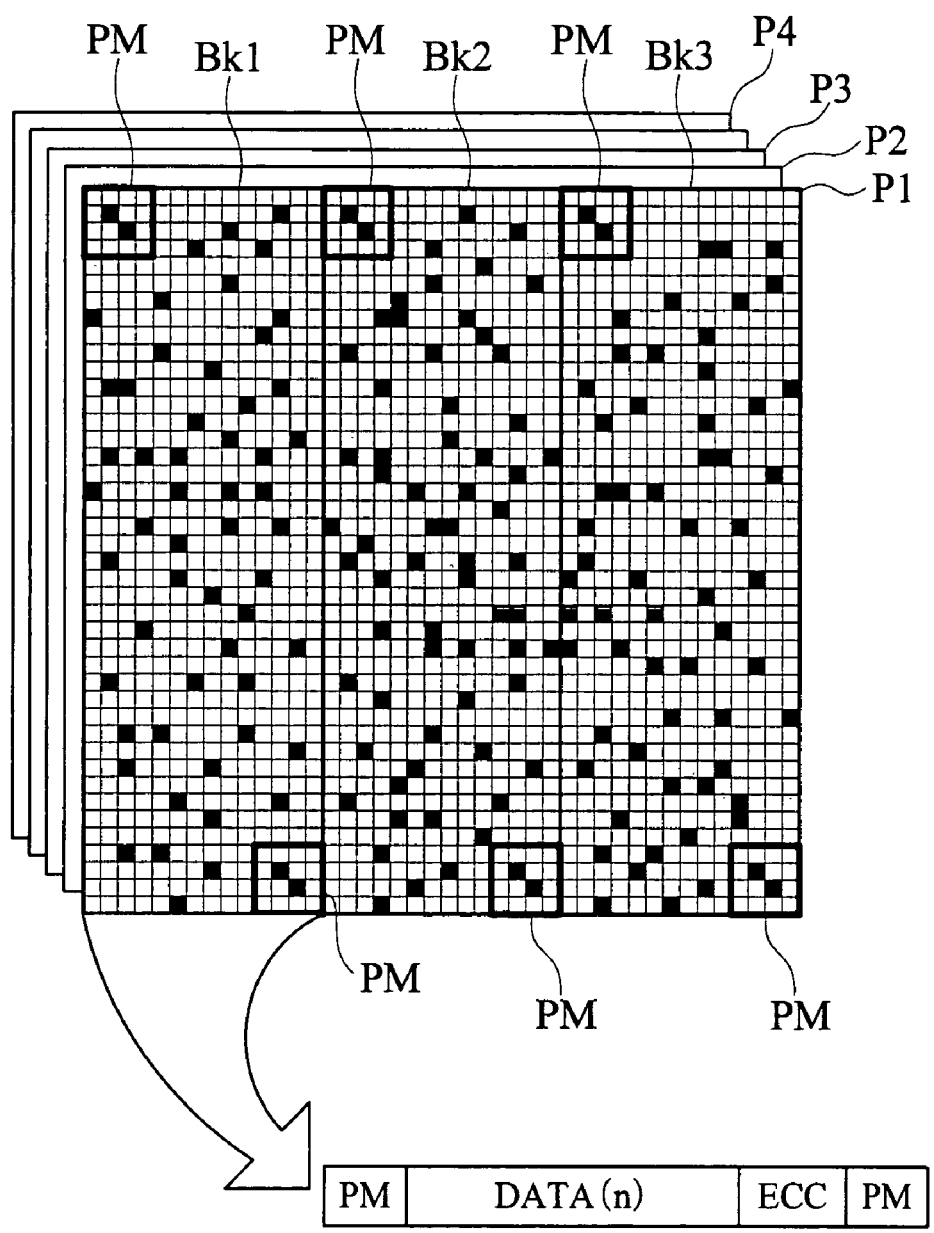
FIG. 2 is an explanatory diagram for describing a function of the hologram recorder/player in FIG. 1.

When recording, on the other hand, the reference beam R from the first beam splitter 3 is guided via the fixed mirrors 8A, 8B to the recording galvanometer mirror 9. The recording galvanometer mirror 9 varies the incident angle of the reference beam R with respect to the unit recording region. The galvanometer mirror 9 is configured to direct the reference beam R to the unit recording region. After leaving the recording galvanometer mirror 9, the reference beam R passes through the condenser lenses 10A, 10B and meets the recording beam S on the unit recording region, upon which the beam-incident-angle variable controller 30 controls a tilt of beam reflection surface of the galvanometer mirror 9. Thereby, the incident angle of the reference beam R on the unit recording region, i.e. the angle made by the recording beam S and the reference beam R takes one of predetermined angles ($\theta 1$ through $\theta 4$ for example). As a result, holograms, each of which has a pattern specific to the selected one of the incident angles $\theta 1$ through $\theta 4$ of the reference beam R, are recorded page by page in the unit recording region. The pixel pattern in FIG. 2 shows a pixel pattern of the recording beam S for page P1 in the case where the incident angle of the reference beam R is $\theta 1$: Like this page, in all the holograms recorded in the pages P1 through P4, the recording beam S is divided into a plurality of blocks Bk1 through Bk3. The blocks Bk1 through Bk3, which abut side by side one after another, lie circumferentially of the hologram recording medium B. Specifically, in each of the pages P1 through P4, a hologram is recorded in parts, in the blocks Bk1 through Bk3, and each part includes recording information as part of the write data and error correction codes for that particular recording information. Each of the blocks Bk1 through Bk3 includes interference patterns which represent the block position detection marks PM disposed diagonally at two corner portions of the block.

Figure 3:
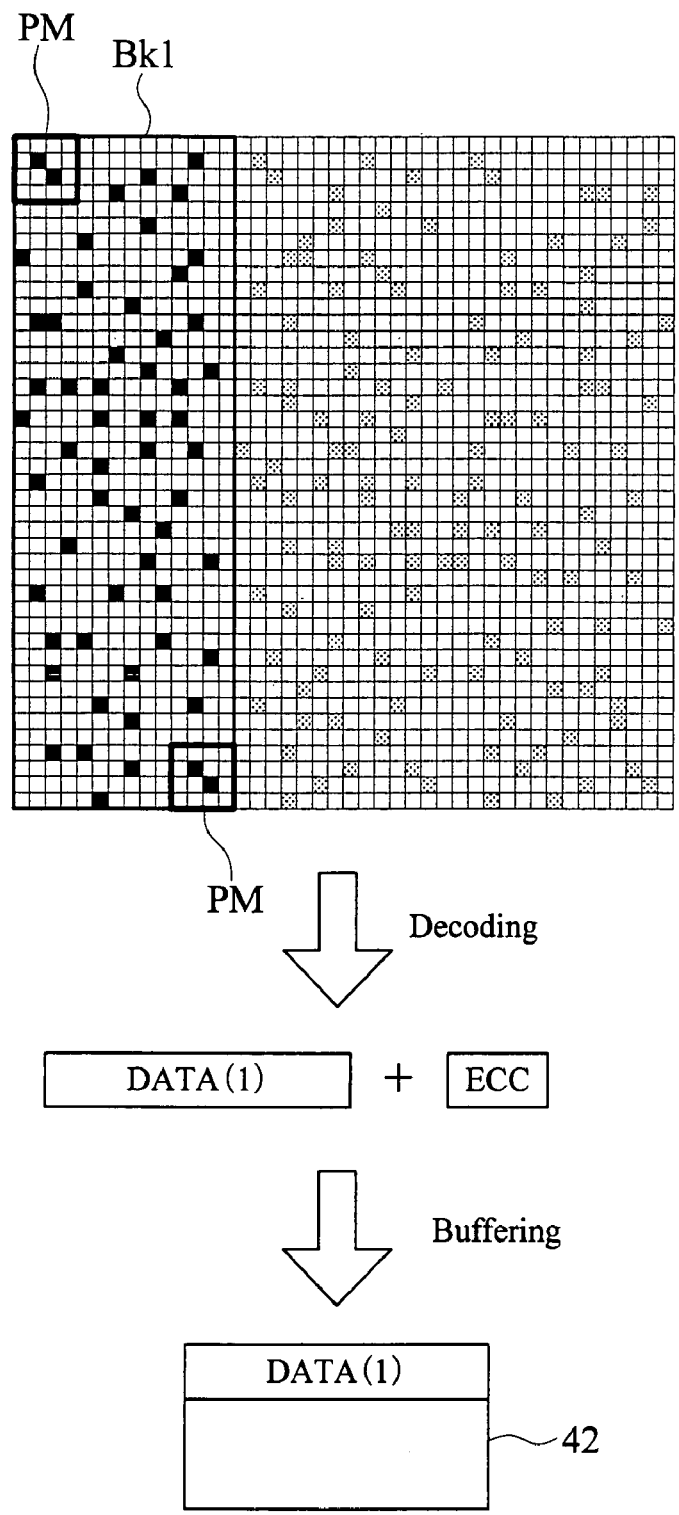
FIG. 3 is an explanatory diagram for describing a function of the hologram recorder/player in FIG. 1.
Figure 4:
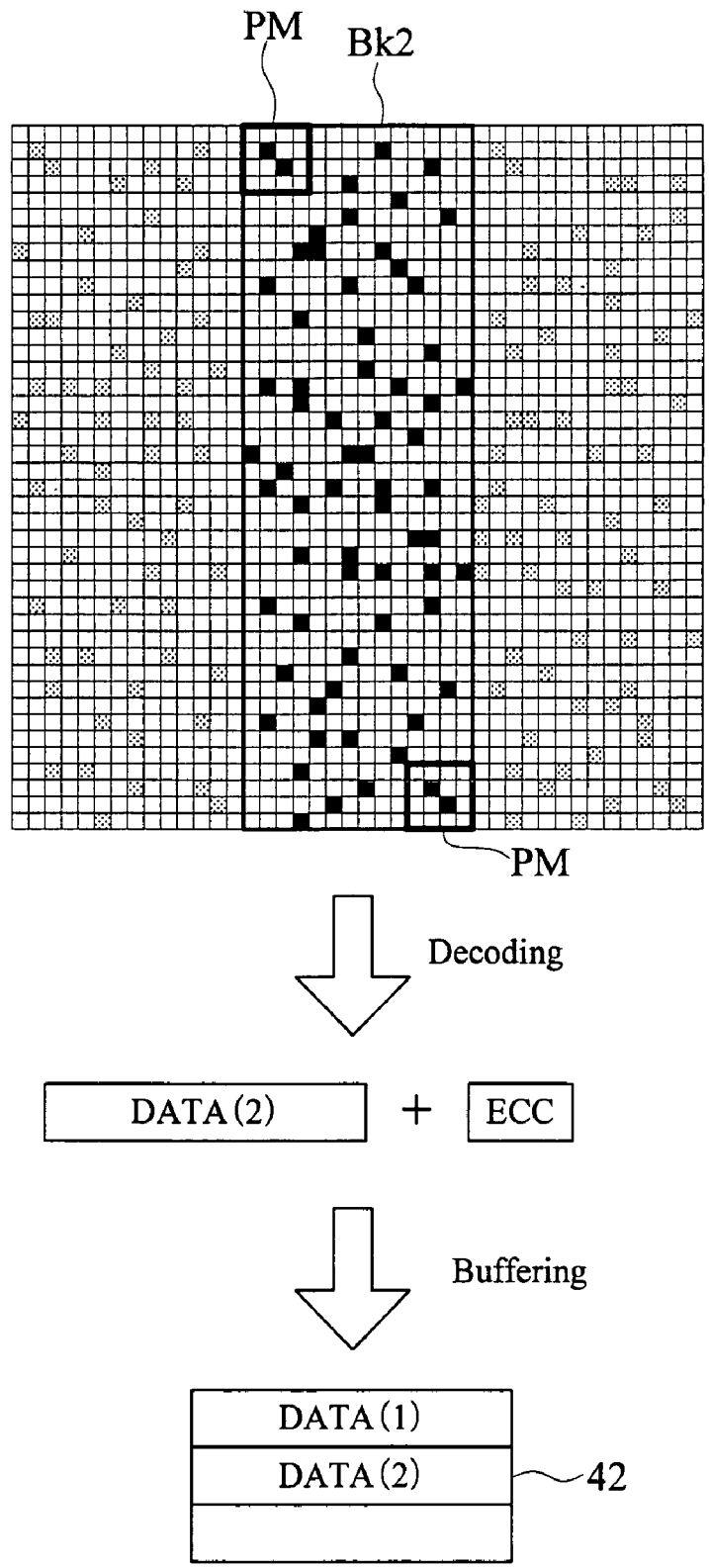
FIG. 4 is an explanatory diagram for describing a function of the hologram recorder/player in FIG. 1.
Figure 5:
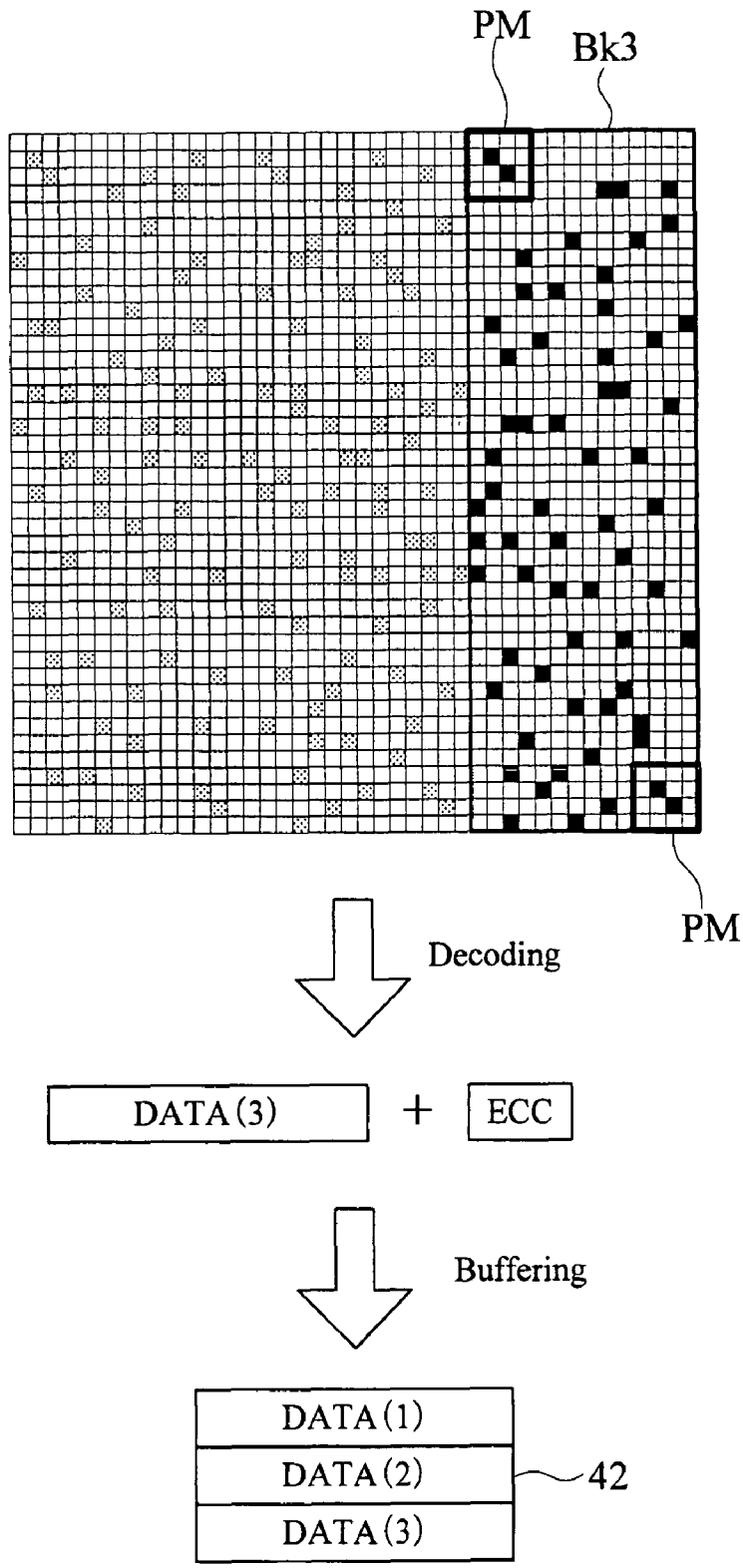
FIG. 5 is an explanatory diagram for describing a function of the hologram recorder/player in FIG. 1.

When replaying, the reference beam R is guided via the fixed mirror 8C to the replaying galvanometer mirror 11. The replaying galvanometer mirror 11 varies the incident angle of the reference beam R with respect to the unit recording region at the time of replay. The galvanometer mirror 11 is configured to direct the reference beam R toward the unit recording region from the opposite side of the hologram recording medium B as from during the recording. The reference beam R from the replaying galvanometer mirror 11 becomes a conjugated beam whose direction is opposite to the direction at the time of recording. The reference beam R passes through the condenser lenses 12A, 12B and then illuminates the unit recording region. In this process, the beam-incident-angle variable controller 30 varies the incident angle of the reference beam R more finely than the predetermined angles $\theta 1$ through $\theta 4$ which are the angles for recording. For example, at the time of replay, the incident angle of the reference beam R is varied within a range from $\theta 1 \pm \alpha$ to a range $\theta 4 \pm \alpha$ (where $\alpha$ represents an angle which is sufficiently smaller than the angular interval used in variable control in the range $\theta 1$ through $\theta 4$). Such a finer variation is necessary because beam application conditions at the time of replay are slightly different from those at the time of recording due to shrinkage of the medium caused by heat from the applied laser beam and variation in the wavelength. Setting the incident angles of the reference beam R for replaying operation identical to the incident angles $\theta 1$ through $\theta 4$ which are for recording operation does not produce a set of replay beams which can cover the holograms in all of the pages P1 through P4 uniformly. Thus, when replaying the hologram from page P1 in FIG. 2 for example, the incident angle of the reference beam R is varied within a range of $\theta 1 \pm \alpha$. At a certain optimal incident angle within this particular range of $\theta 1 \pm \alpha$ for the incident angle of the reference beam R as shown in FIGS. 3 through 5, there comes a replay beam which is tuned in a portion of the hologram stored in each of the blocks Bk1 through Bk3, at a light intensity exceeding a predetermined value. As described earlier, the blocks Bk1 through Bk3 are laid circumferentially of the hologram recording medium B. The blocks Bk1 through Bk3 are laid in such a way because the replay beam tends to have an intense part and a weak part generally circumferentially of the hologram recording medium B.

The photo detector 13, which is provided by a CCD area sensor or a CMOS area sensor, receives the replay beam which comes back to the second beam splitter 6 via the object lens 7 and the relay lenses 7A, 7B at the time of replaying. By the photo detector 13 as described, the block position detection marks PM are detected first, and when the intensity of the beam received from the rectangular photo-reception areas, i.e. the marks PM, reaches or exceeds a predetermined value, a replay beam for the corresponding blocks Bk1 through Bk3 are detected, and beam detection signals are outputted to the decoding processor 40 accordingly. In other words, the replay beam is detected reliably for each of the blocks Bk1 through Bk3, and the recording information (DATA 1 through 3) and the error correction codes (ECC) contained in the blocks Bk1 through Bk3 are supplied to the decoding processor 40 in the form of the beam detection signal, for each of the blocks Bk1 through Bk3.

The decoding processor 40 decodes the beam detection signal for each of the blocks Bk1 through Bk3, thereby converting the beam detection signal into the recording information and the error correction codes. The recording information and the error correction codes are supplied to the code checker 41. The code checker 41 checks if there is any error in the recording information, based on the error correction code. If the recording information is found to be correct, the recording information is stored in the buffer 42. When all the recording information contained in DATA 1 through 3 is buffered in the buffer 42, the whole set of recording information is outputted as read data. Specifically, the read data is an equivalent of the write data representing a hologram recorded in one page. On the other hand, if the code checker 41 finds errors in the recording information, the code checker 41 corrects these errors, and sends the flawless recording information to the buffer 42.

Next, description will cover a function of the hologram recorder/player A with reference mainly to FIGS. 2 through 5.

As shown in FIG. 2, at the time of recording, holograms each having a pixel pattern specific to the incident angle $\theta 1$ through $\theta 4$ of the reference beam R are recorded in pages P1 through P4 respectively in the unit recording region. In each of the pages P1 through P4, the hologram is stored in parts, in predetermined blocks Bk1 through Bk3, and each of the blocks Bk1 through Bk3 contains a portion of the write data, i.e. recording information (DATA 1 through DATA 3), error correction codes (ECC) for that recording information, and the block position detection marks PM.

At the time of replay, on the other hand, as shown in FIG. 3 through 5 for example, the reference beam R is applied to the unit recording region, with its incident angle being varied within the variation range $\theta 1 \pm \alpha$. If there is no shrinkage of the medium or wavelength change in this process, a replay beam for the hologram in the entire page P1 is detected in this process, at the same incident angle $\theta 1$ of the reference beam R as at the time of recording. Generally, however, there is shrinkage in the medium or change in the wavelength, and a different beam application condition must be used at the time of replay. For this reason, variable control is performed to slightly vary the incident angle of the reference beam R from the angle $\theta 1$ which is the angle that was used at the time of recording. When the incident angle of the reference beam R becomes appropriate is the state where the beam application condition is partially identical with the condition used at the time when the hologram in the blocks Bk1 through Bk3 was recorded. Thus, a replay beam for each of the holograms in the blocks Bk1 through Bk3 is detected. It should be noted here that a different method may be used for the variable control on the incident angle of the reference beam R in the replay operation: For example, the hologram recording medium B may be rotated by an extremely slight amount thereby making a very slight shift in the position of unit recording region with respect to the reference beam R. This method enables more reliable detection by the photo detector 13, of the replay beam for the hologram in each of the blocks Bk1 through Bk3.

Upon detection of the replay beam for each of the blocks Bk1 through Bk3, the photo detector 13 outputs a beam detection signal, and based on the beam detection signal, the decoding processor 40 generates recording information and error correction codes, for each of the blocks Bk1 through Bk3. Partial errors in the recording information for any of the blocks Bk1 through Bk3 are corrected by using appropriate error correction codes. The recording information thus obtained is sequentially buffered in the buffer 42 for each of the blocks Bk1 through Bk3. When recording information for all of the blocks Bk1 through Bk3 is held in the buffer 42, the recording information is outputted from the buffer 42, as a complete set of data, i.e. read data for the entire hologram in page P1. Such a cycle of operations as described above is performed also to the pages P2 through P4, whereby a complete replay operation of the holograms stored in one unit recording region is performed. If a replay operation is also to be made to holograms stored in the next unit recording region, the hologram recording medium B is rotated to bring this next unit recording region into alignment with the reference beam R, and then the above-described cycle of replay operations is performed.

Therefore, according to the hologram recorder/player A provided by the present embodiment, it is possible to replay holograms accurately in their entirety even if the application of reference beam R has caused thermal shrinkage of the medium or change in wavelength, because the hologram recorded in the unit recording region is replayed in parts, from a plurality of blocks Bk1 through Bk3.

The present invention is not limited to the embodiment described above.

For example, the error codes contained in each block may be error detection codes which serve only for checking the recording information for errors and not usable for correcting the errors. In this case where each block contains such error detection codes as described above, detection of an error in the recording information in a certain block based on an error detection signal at the time of replay will cause the system to re-do the unsuccessful part of replay operation for a portion of the hologram stored in this particular block.

The invention claimed is:

1. A hologram recorder/player for recording a hologram in a recording medium and for replaying the hologram recorded in the recording medium comprising:
    a light source emitting laser;
    a beam splitter splitting the laser into a recording beam and a reference beam;
    a spatial light modulator modulating the recording beam in a unit recording region;
    a first optical system for illuminating the hologram recording medium with the modulated recording beam;
    a second optical system for illuminating the hologram recording medium with the reference beam; and
    a photo detector detecting light from the hologram recording medium;
    wherein the spatial light modulator is used for writing the hologram into the unit recording region of the hologram recording medium as a plurality of blocks,
    wherein each of the plurality of blocks includes recording information and at it one of an error correction code and an error detection code which corresponds to the recording information.

2. The hologram recorder/player according to claim 1, wherein each of the plurality of blocks further includes a position detection mark.

3. The hologram recorder/player according to claim 1, further comprising incident angle variable control means which changes an incident angle of the reference beam with reference to the hologram recording medium by controlling the second optical system.

4. The hologram recorder/player according to claim 3, wherein the incident angle variable control means perform a rough adjusting control in which the incident angle is set to any one of a plurality of steps and a fine adjusting control in which the incident angle is subtly changed with reference to the set one of the plurality of steps.

5. The hologram recorder/player according to claim 1, further comprising decoding means which extract the recording information and one of the error correction code and error detection code from each of the plurality of blocks detected by photo detector, and code checking means which check whether the decoded recording information includes an error or not based on the one of the error correction code and error detection code.

6. A method for recording a hologram in a recording medium and for replaying the hologram recorded in the recording medium comprising the steps of:
    splitting laser generated from a light source into a recording beam and a reference beam;
    modulating the recording beam in a unit recording region, to have the recording beam carry recording information; and
    illuminating the unit recording region of the hologram recording medium with the modulated recording beam and the reference beam simultaneously,
    wherein the unit recording region includes a plurality of blocks,
    wherein each of the plurality of blocks includes the recording information and at least one of an error correction code and an error detection code.

7. The method according to claim 6 further comprising the steps of illuminating the unit recording region with the reference beam while an incident angle of the reference beam is controlled, and detecting a reproduced beam emitted from the hologram recording medium with a photo detector, wherein the detected, reproduced beam is decoded into the recording information and the one of the error correction code and the error detection code, and then it is checked whether the recording information includes an error or not based on the one of the error correction code and the error detection code.

* * * * *